United States Patent
Everett-Church (10) Patent No.: US 8,528,003 B2
(45) Date of Patent: Sep. 3, 2013

(54) COMMUNICATION AMONG BROWSER WINDOWS

(75) Inventor: Justin Charles Everett-Church, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2421 days.

(21) Appl. No.: 10/753,106

(22) Filed: Jan. 6, 2004

(65) Prior Publication Data
US 2005/0108033 A1 May 19, 2005

Related U.S. Application Data

(60) Provisional application No. 60/528,609, filed on Dec. 10, 2003, provisional application No. 60/514,770, filed on Oct. 27, 2003.

(51) Int. Cl.
*G06F 9/54* (2006.01)

(52) U.S. Cl.
USPC .................. 719/313; 719/319; 719/320

(58) Field of Classification Search
USPC .................. 719/328, 310, 313, 320, 329
See application file for complete search history.

(56) References Cited

U.S. PATENT DOCUMENTS

| | | | |
|---|---|---|---|
| 5,848,424 A | 12/1998 | Scheinkman et al. | |
| 6,161,148 A | 12/2000 | Pratt et al. | |
| 6,550,021 B1* | 4/2003 | Dalphy et al. | 714/11 |
| 6,715,144 B2* | 3/2004 | Daynes et al. | 717/174 |
| 6,721,921 B1* | 4/2004 | Altman | 715/512 |
| 6,865,599 B2* | 3/2005 | Zhang | 709/218 |
| 2002/0029245 A1* | 3/2002 | Nahon et al. | 709/204 |
| 2002/0104096 A1* | 8/2002 | Cramer et al. | 725/113 |
| 2004/0163042 A1* | 8/2004 | Altman | 715/512 |
| 2005/0268215 A1* | 12/2005 | Battagin et al. | 715/503 |

FOREIGN PATENT DOCUMENTS
EP 0 475 600 A2 3/1992

OTHER PUBLICATIONS

Ebert, Jurgen et al, JKogge: a Component-Based Approach for Tools in the Internet, 1999, pp. 1-12.*
Communication between plugins, Jan. 31, 2003, http://dev.eclipse.org/mhonarc/lists/pde-dev/msg00051.html.*
Mike Chambers, "Macromedia Flash MX Security," Mar. 2002, pp. 1-22.*
Russell Chun, "Macromedia Flash MX Advanced for Windows and Macintosh: Visual QuickPro Guide: Chapter 06," May 8, 2002, 7 pages.*
"The AF FS Command JavaScript Library," retrieved from website:ashzfall.com/flash/fscomlib/index.html, Copyright 2000, 2 pages.*
"Talk to Yourself," retrieved from website:http://web.archive.org/web/*/http://www.ashzfall.com/examples/flash/fscom/, Jan. 24, 2001, 3 pages.*
Brockshmidt, K, "Inside OLE—Second Edition" (1995) Microsoft Press, Redmond, Washington, XP002319883, Chapter 13 pp. 593-632.
International Search Report received in corresponding PCT international application No. PCT/US2004/035866.

* cited by examiner

*Primary Examiner* — Li B Zhen
(74) *Attorney, Agent, or Firm* — Hickman Palermo Truong Becker Bingham Wong LLP (57) ABSTRACT

A technique for communicating among browser windows includes communicating between a first browser window and a first plugin file; communicating between the first plugin file and a second plugin file, wherein the second plugin file is associated with a second browser window; and communicating between the second plugin file and the second browser window, and wherein the plugin files function as a communication medium between the first and second browser windows.

4 Claims, 9 Drawing Sheets

COMMUNICATION AMONG BROWSER WINDOWS

CROSS REFERENCE TO RELATED APPLICATIONS

This application claims priority to U.S. Provisional Patent Application No. 60/528,609 entitled COMMUNICATION AMONG BROWSER WINDOWS filed Dec. 10, 2003 which is incorporated herein by reference for all purposes; and U.S. Provisional Patent Application No. 60/514,770 entitled BROWSER TO BROWSER COMMUNICATION filed Oct. 27, 2003 which is incorporated herein by reference for all purposes.

FIELD OF THE INVENTION

The present invention relates generally to computer software. More specifically, a technique for communicating in a computer environment is disclosed.

BACKGROUND OF THE INVENTION

Communicating information over the Internet is a significantly popular activity. Different types of information can be communicated using a variety of techniques including emailing, web browsing, or instant messaging (IM). Such applications often run in parallel with each other on a user's computer. For example, a user can browse the web in one window while communicating with a friend in an IM window. Upon viewing interesting information in a webpage, the user may desire to share it with the friend in the IM window. Typically, the user would cut and paste or somehow manually transfer the information from the browser window to the IM environment to send it to the friend. Automatic communication is typically limited due to security restrictions imposed by most browsers. For example, different browser programs, such as Netscape and Internet Explorer, typically do not communicate with each other through JavaScript. Even different versions of the same browser program can function differently, thus restricting browser to browser communication. Finally, even if two browser windows are running in the same browser program, they typically do not communicate. It would be beneficial to facilitate communication between browser windows.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for communicating among browser windows is disclosed. In one embodiment, plugin files function as a communication medium between the browser windows. In some embodiments, the plugin files are associated with a Flash player.

Figure 1A:
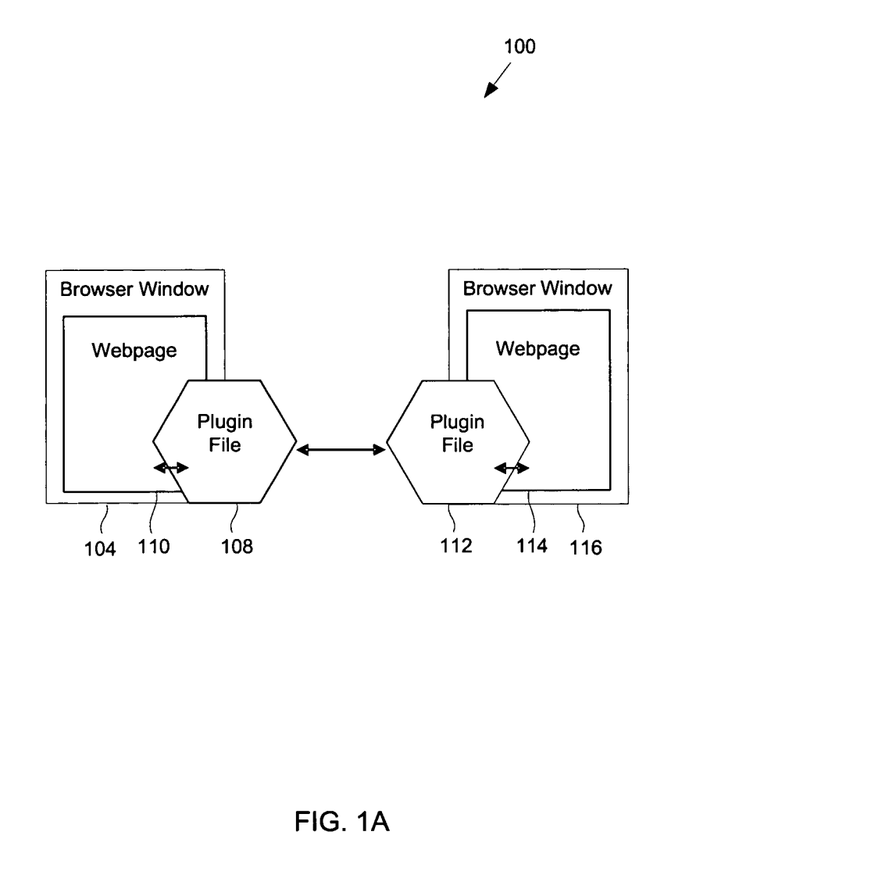
FIG. 1A is a block diagram of a technique used in one embodiment for communicating among browser windows.

FIG. 1A is a block diagram of a technique used in one embodiment for communicating among browser windows. As used herein, a browser window includes a window, frame, or pop-up window running an instance of an information display program, such as a browser program. For example, one browser program can run with multiple browser windows. Two browser programs, such as a web browser and an instant messenger program, can run in separate frames within one browser window. A browser or browser program, as used herein, includes a web browser, instant messaging program, or any other program that can run a webpage. A webpage, as used herein, includes any file written or generated in HTML, JavaScript, VBScript or any other languages that can run on a browser. As used herein, an IM program can run a webpage file. For simplicity, these browser windows are discussed in conjunction with a computer environment. The computer environment can include any environment associated with processing that can facilitate communication, such as a computer, a mobile device, a personal digital assistant (PDA), etc.

In this example, technique 100 is shown to include webpage 110 and plugin file 108 running in browser window 104 and webpage 114 and plugin file 112 running in browser window 116. A plugin or plugin program, as used herein, includes any program designed to run in conjunction with a browser program. For example, a plugin can be a Flash player, a Java Virtual Machine (JVM), or an ActiveX Control. A plugin file is a file that can run on a plugin. For example, a Flash player runs a Flash movie. Webpage 110 and webpage 116 are shown to communicate with plugin file 108 and plugin file 112, respectively. Plugin file 108 and plugin file 112 can function as a communication medium between browser window 104 and browser window 116. Plugin files can enable communication among all browser windows running on a computer.

In one embodiment, clicking on various elements in one webpage in one browser window can affect what occurs in another webpage in another browser window. A webpage can change the content, cause a form to be submitted, or populate variables, including hidden variables, in another webpage. Numerous useful applications can be enabled by this ability to communicate between browser windows. In an advertising example, clicking on an ad banner in one window can open a new window displaying items for sale. Clicking on an item in the new window can change the content of the first window. For example, additional information about the selected item can be shown in the first window. In a shopping example, clicking on a shirt in a shopping webpage can open a zoomed view of the shirt in a pop-up window. Choosing to view the shirt in red in the pop-up window could also change the view of the shirt to red in the original shopping webpage. If a user has multiple browser windows open, a webpage in one browser window can send information to other webpages in other windows. For example, a user can sign out in one browser window, which can send a sign off notice to another window. Webpages can also interact with an IM program, allowing elements to be broken out into a separate webpage while remaining in contact with the message conversation. Several examples of this embodiment are discussed further below.

Figure 1B:
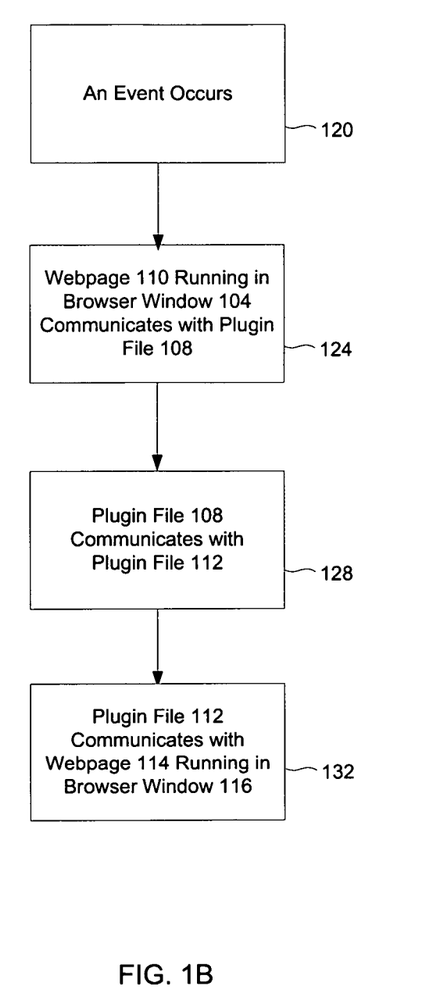
FIG. 1B is a flowchart of a technique used in one embodiment for communicating among browser windows.

FIG. 1B is a flowchart of a technique used in one embodiment for communicating among browser windows. This technique can be used in conjunction with the embodiment shown in FIG. 1A. In this example, two browser windows are open, browser window 104 and browser window 116, as shown in FIG. 1A. An event occurs (120). The event can be a system event or user action. Examples of a system event include an immediate load or onload event. Examples of a user action include a user clicking a button or a link to a webpage.

Webpage 110 in browser window 104 communicates with plugin file 108 (124). Communicating can include calling a function in plugin file 108. For example, JavaScript in webpage 110 can call a function in plugin file 108 by passing a function ID or function name to plugin file 108. Plugin file 108 can be a Flash movie or any other type of plugin file. Plugin file 108 communicates with plugin file 112 (128). For example, plugin file 108 can pass arguments to plugin file 112. Plugin file 112 then communicates with webpage 114 in browser window 116 (132). Communicating can include calling a function in webpage 114. For example, plugin file 112 can call a function that causes JavaScript to execute in browser window 116. For example, a Flash movie can call fscommand, which executes the instructions as JavaScript in the browser window. In this example, the direction of communication is shown to be from browser window 104 to browser window 116. Communication from browser window 116 to browser window 104 can also be performed in a similar manner. In some embodiments, communication flows from webpage 110 to plugin file 108, and then to plugin file 112 before being passed to webpage 114. Thus, the data appears to have been passed locally from the perspective of webpage 114.

In some embodiments, if the Flash player is installed on a computer, a browser window running a Flash movie can communicate with other browser windows running Flash movies.

Figure 2A:
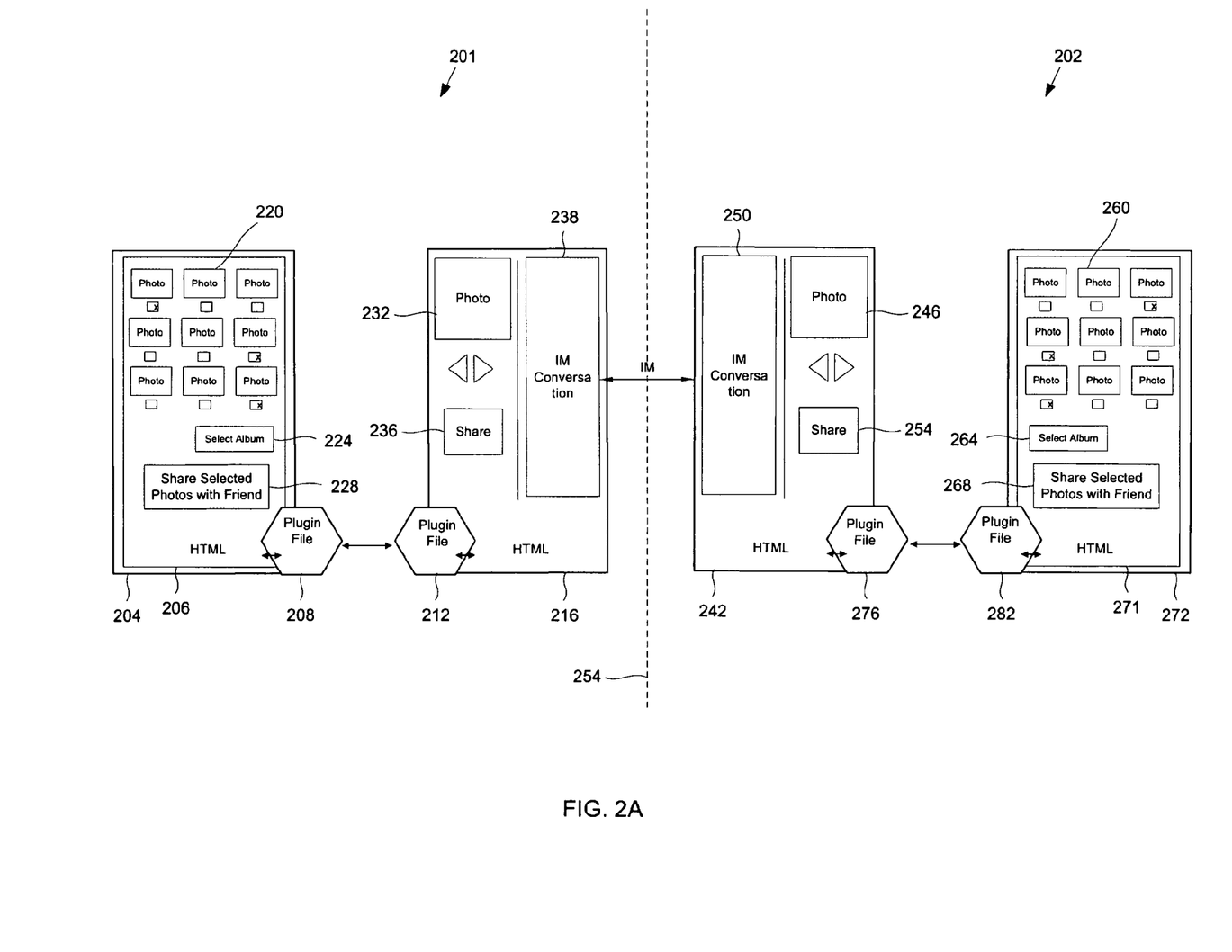
FIG. 2A is a block diagram of a technique used in one embodiment for communicating between an IM window and a web browser viewing photos in a webpage.

FIG. 2A is a block diagram of a technique used in one embodiment for communicating between an IM window and a web browser viewing photos in a webpage. In this example, the webpage files may be stored locally or on network computer, such as a web server. In this example, two users are communicating using instant messenger programs. Each user is also running a web browser. Dotted line 254 divides the figure into a first user's computer 201 and a second user's computer 202. Computer 201 is shown to include web browser 204, plugin file 208, plugin file 212, and IM window 216. IM window 216 runs an IM program. The IM program can run HTML code and therefore is a type of browser program. IM window 216 includes IM conversation display 238, photo display 232, and "share" button 236. Web browser 204 is shown viewing photos webpage 206 which includes photos. Webpage 206 includes photo thumbnails 220, "select album" button 224, and "share selected photos" button 228. Computer 202 is shown running the same programs as computer 201. Computer 202 is shown to include web browser 272, plugin file 282, plugin file 276, and IM window 242. IM window 242 includes IM conversation display 250, photo display 246, and "share" button 254. Computer 202 also includes a web browser 272 browsing photos in a webpage.

The first user can view the IM conversation between the two users in IM conversation display 238. The first user can also view photos in photo display 232 and share photos with the second user as follows. Clicking on "share" button 236 launches browser window 204, which opens photos webpage 206. In photos webpage 206, the user can select a photo by clicking on a check box beneath a thumbnail of the photo. The user can select a whole album of photos by clicking on "select album" button 224. When the user clicks on "share selected photos" button 228, information associated with the selected photos is communicated to IM window 216. The photo information can then be sent to computer 202 using the IM program. The shared photo can then be displayed in photo display 246. There are many other interfaces that can be used to select, transfer, and display photos for sharing. For example, photos webpage 206 could include a list of files and directories that can be selected. Alternatively, double clicking on a photo thumbnail could launch a new window that displays the full sized photo and includes a button for sharing that photo.

Figure 2B:
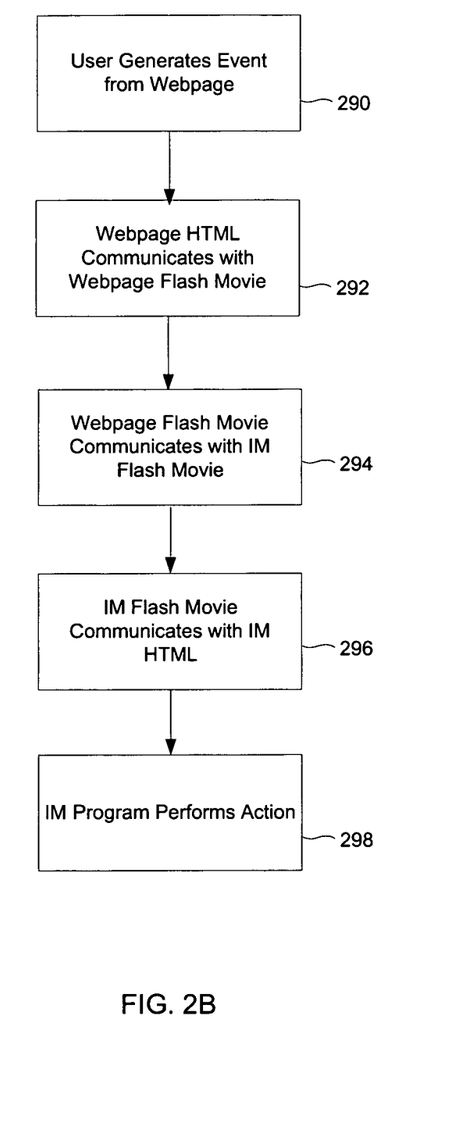
FIG. 2B is a flowchart of a technique used in one embodiment for communicating between an IM window and a web browser viewing photos in a photos webpage.

FIG. 2B is a flowchart of a technique used in one embodiment for communicating between an IM window and a web browser viewing photos in a photos webpage. This technique can be used in conjunction with the embodiment shown in FIG. 2A, assuming plugin file 208 and plugin file 212 are Flash movies. In this example, a Flash plugin is used, but a Flash plugin is just one example of many plugins that can be used. In this example, a user generates an event from a webpage (290). An event can include a user action such as clicking on a button. For example, in FIG. 2A, the first user clicking on "share selected photos" button 228 can qualify as an event. Once the event is generated, HTML in the webpage communicates with the webpage Flash movie (292). For example, HTML in webpage 206 can include JavaScript that calls a function in Flash movie 208. The function can send information associated with the event to Flash movie 208. In some embodiments, the information sent is an index or identification number associated with the action. Each possible user action corresponds to an index number. In one example, an index value of 0 corresponds to the action "select album", an index value of 1 corresponds to the action "select photo", and an index value of 2 corresponds to the action "click share". The webpage Flash movie communicates with an IM Flash movie (294). For example, in FIG. 2A, Flash movie 208 can communicate with Flash movie 212 using predefined methods such as fscommand for communicating between Flash movies. The IM Flash movie then communicates with HTML in the IM window (296). For example, the IM Flash movie can include a call to fscommand, which can send information to the IM program based on the event index described above. The IM program performs an action (298). The action can be based on the information received from the IM Flash movie, such as an ID. For example, the action can include displaying a shared photo in photo display 232. The IM program can then send appropriate information to IM program 242 in computer 202. Computer 202 can in turn display the shared photo in photo display 246. Information can similarly be communicated to browser window 272 as appropriate.

The second user does not necessarily need to have browser window 272 open. However, the second user may wish to share photos with the first user, in which case, the technique can be symmetrically applied in the reverse direction. In this case, photo information is communicated from browser window 272 to IM window 242, which then communicates the information from IM window 216, and then optionally to browser window 204.

More than two browser windows can be used. For example, plugin file 208 can communicate with plugin file 212 and another plugin file running in the second browser window. Accordingly, communication can occur between any number of plugin files and thus between any number of browser windows.

Figure 3A:
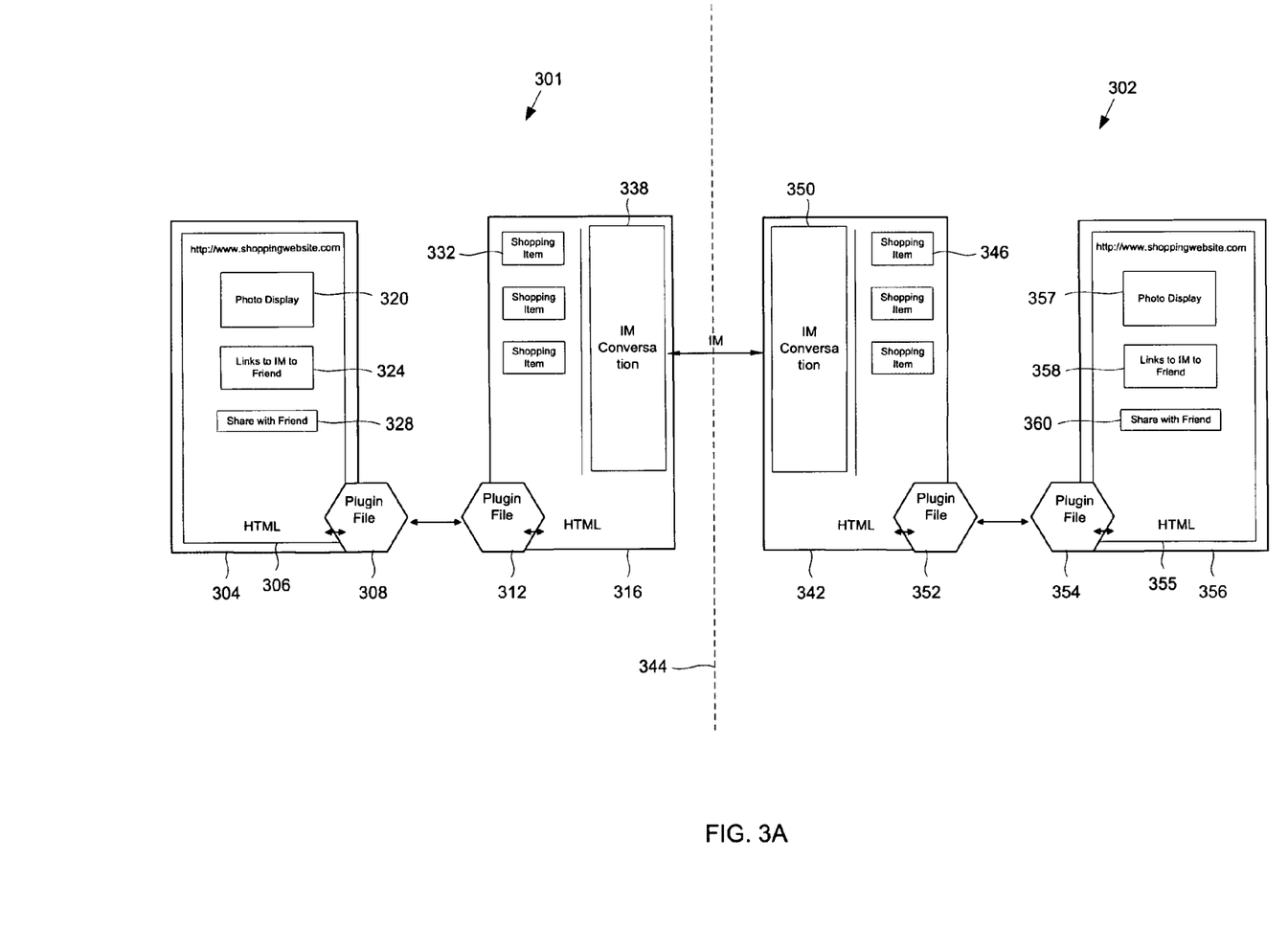
FIG. 3A is a block diagram of a technique used in one embodiment for communicating between an IM window and a web browser viewing a shopping webpage.

FIG. 3A is a block diagram of a technique used in one embodiment for communicating between an IM window and a web browser viewing a shopping webpage. In this example, two users are communicating using instant messenger programs. Each user is also viewing a shopping webpage in a web browser. Dotted line 344 divides the figure into a first user's computer 301 and a second user's computer 302. Computer 301 is shown to include web browser 304, plugin file 308, plugin file 312, and IM window 316. IM window 316 includes IM conversation display 338, and shopping items 332. Web browser 304 is shown viewing shopping webpage 306. Webpage 306 includes item display 320, links 324 and "share with friend" button 328. In this example, computer 302 is running the same programs as computer 201. Computer 302 is shown to include web browser 356, plugin file 354, plugin file 352, and IM window 342. IM window 342 includes IM conversation display 350 and shopping items 346. Computer 302 also includes a web browser 356 viewing a shopping webpage.

The first user can view an IM conversation between the two users in IM conversation display 338. Clicking on a shopping item 332 launches browser window 304, which opens shopping webpage 306. In shopping webpage 306, the shopping item is displayed in item display 320. The user can share the item by clicking on "share with friend" button 328. The user can also share a link to a shopping item by clicking on one of links 324. When the user clicks on "share with friend" button 328 or one of links 324, the information associated with the shopping item to be shared is communicated to IM window 316. The shopping item information is then sent to computer 302 using the IM program. On computer 302, the shopping item can be displayed as one of shopping items 346 or in item display 357. There are many other interfaces that can be used to select and share shopping items. For example, the shopping webpage could include a list of shopping items and a "share selected items" button. Items can be selected and shared with a friend when the "share selected items" button is clicked. Alternatively, clicking on a link 324 could launch a new window that displays a shopping item in detail and includes a button for sharing that shopping item. A thumbnail of the shopping item can be displayed to the friend or a window displaying the item in detail can be displayed to the second user.

Figure 3B:
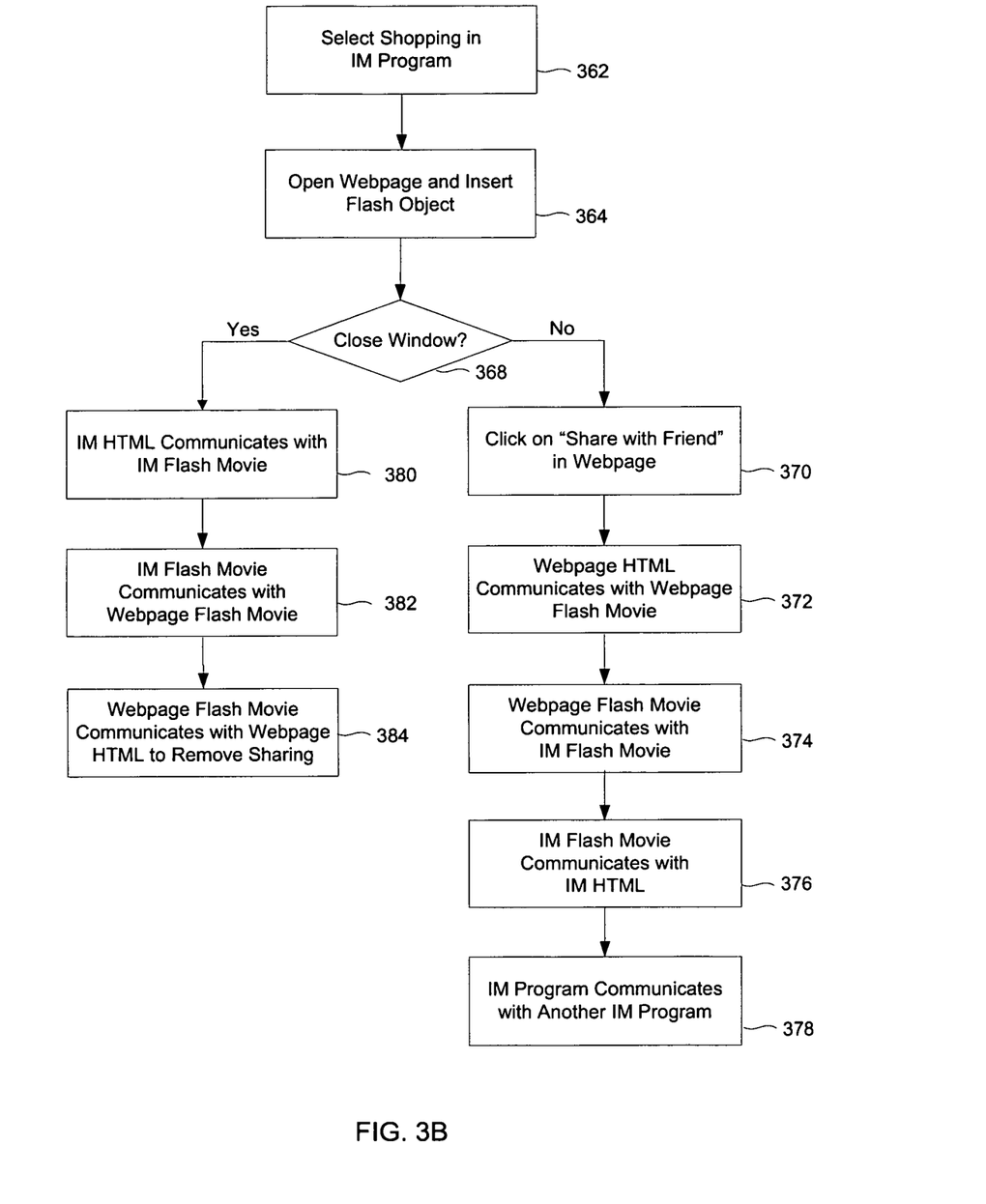
FIG. 3B is a flowchart of a technique used in one embodiment for communicating between an IM window and a web browser viewing shopping items in a shopping webpage.

In some embodiments, communicating shopping item information from web browser 304 to IM window 316 can be performed using the technique described in conjunction with FIG. 3B. FIG. 3B is a flowchart of a technique used in one embodiment for communicating between an IM window and a web browser viewing shopping items in a shopping webpage. This technique can be used in conjunction with the embodiment shown in FIG. 3A, assuming plugin file 308 and plugin file 312 are Flash movies. In this example, a Flash plugin is used, but a Flash plugin is just one example of many plugin programs that can be used. In this example, shopping is selected in an IM window (362). For example, shopping can be selected by clicking on a shopping button in an IM window. Alternatively, shopping can be selected by clicking on a shopping item, such as one of shopping items 332 as shown in FIG. 3A. Once shopping is selected, a shopping webpage is opened and a Flash object is inserted (364). For example, the shopping webpage can be the home page of a shopping website, or a page that includes information about a shopping item that was selected. The Flash object should be transparent to a user viewing the webpage unless the Flash movie serves a purpose other than for communication with another Flash movie. For example, the object could be an invisible pixel or pixels inserted in the corner or edge of the webpage. The Flash object could be a logo that would otherwise be in the webpage even if the webpage did not include a Flash movie. The Flash object could also be a button, such as "share with friend" button 328. Other Flash objects could potentially be inserted in the webpage to communicate with Flash movie 308, such as links 324. Once the browser window is open to the shopping webpage, it is determined whether the window is closed (368). If the IM window is closed at any point, this event can be communicated to the shopping webpage as follows. HTML in the IM program communicates with the IM Flash movie (380). For example, the IM program can include JavaScript calls to the IM Flash movie. The IM Flash movie then communicates with the webpage Flash movie (382). The webpage Flash movie then communicates with the browser window to remove sharing (384). For example, removing sharing can include removing "share with friend" button 328.

If the window remains open (368), assuming a shopping item has been selected, a "share with friend" button in the webpage can be clicked (370). Once the "share with friend" button is clicked, HTML in the webpage communicates with the webpage Flash movie (372). For example, in FIG. 3A, JavaScript in webpage 306 can send a call to Flash movie 308. The call can include information that indicates that the "share with friend button" has been clicked. The webpage Flash movie communicates with the IM Flash movie (374). For example, in FIG. 3A, Flash movie 308 can communicate with Flash movie 312. The IM Flash movie then communicates with HTML in the IM window (376). For example, IM Flash movie 312 can send information to the IM program using fscommand. Once received, the IM program performs appropriate processing. The IM program then communicates with another IM program on another user's machine (378). This can include sending a link or information associated with the shopping items to be shared. Computer 302 then displays the shared shopping items as shopping items 346 in IM window 342. Information can similarly be communicated from IM window 342 to browser window 356 and the shopping items can be displayed in browser window 356.

As with the example shown in FIG. 2A, the second user does not necessarily need to have a browser window open. However, the second user may also wish to share shopping items with the first user, in which case, the technique can be symmetrically applied in the reverse direction. Also, more than two browser windows can be used. Accordingly, communication can occur between any number of plugin files and thus between any number of browser windows.

Figure 4A:
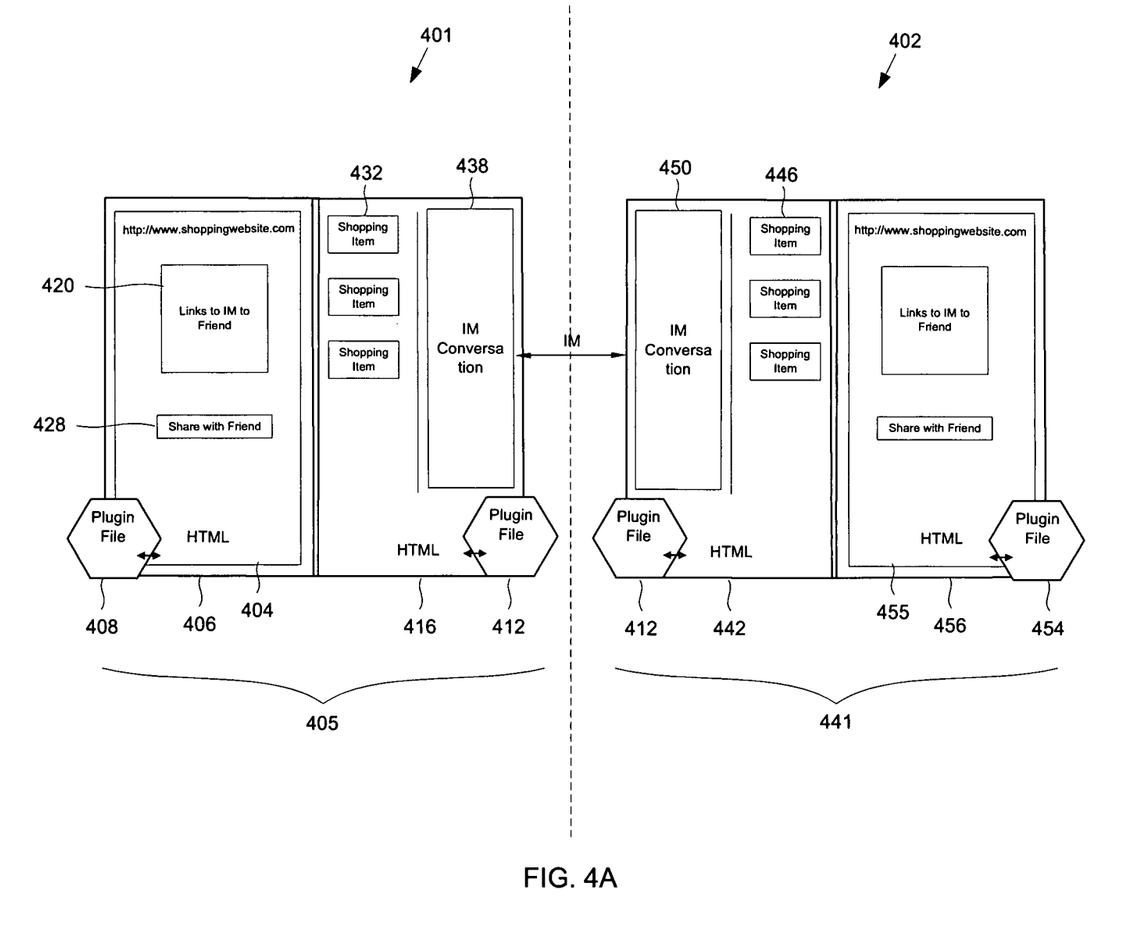
FIG. 4A is a block diagram of a technique used in one embodiment for communicating between an IM frame and a web browser frame.

FIG. 4A is a block diagram of a technique used in one embodiment for communicating between an IM frame and a web browser frame. A frame, as used herein, includes a window within a browser window. One example of a frame is an Iframe. Each frame in a browser window can run as if the frame is an independent browser window. In that respect, this example is functionally similar to the example shown in FIG. 3A. Instead of communicating between browser windows, communication is performed between frames within a browser window. In this example, two users are communicating using instant messenger programs running within a frame of a browser window. Reusing the shopping example of FIG. 3A, each user is also viewing a shopping webpage in another frame of the browser window. Dotted line 444 divides the figure into a first user's computer 401 and a second user's computer 402. Computer 401 is shown to include browser window 405, plugin file 408, and plugin file 412. Browser window 405 includes two frames—web browser frame 404 and IM frame 416. IM frame 416 includes IM conversation display 438, and shopping items 432. Web browser frame 404 is shown viewing shopping webpage 406. Webpage 406 includes item display 420, links 424 and "share with friend" button 428. In this example, computer 402 is running the same programs as computer 401. Computer 402 is shown to include browser window 441, plugin file 454 and plugin file 452. Browser window 441 includes two frames—web browser frame 456 and IM frame 442. IM frame 442 includes IM conversation display 450 and shopping items 446. Web browser frame 456 is also viewing a shopping webpage.

The first user can view an IM conversation between the two users in IM conversation display 438. Clicking on a shopping item 432 launches web browser frame 404, which opens shopping webpage 406. In shopping webpage 406, the shopping item is displayed in item display 420. The user can share the item by clicking on "share with friend" button 428. The user can also share a link to a shopping item by clicking on one of links 424. When the user clicks on "share with friend" button 428 or one of links 424, the information associated with the shopping item to be shared is communicated to IM frame 416. The shopping item information is then sent to computer 402 using the IM program. On computer 402, the shopping item can be displayed as one of shopping items 446 or in item display 457. There are many other interfaces that can be used to select and share shopping items, as discussed with respect to FIG. 3A.

Figure 4B:
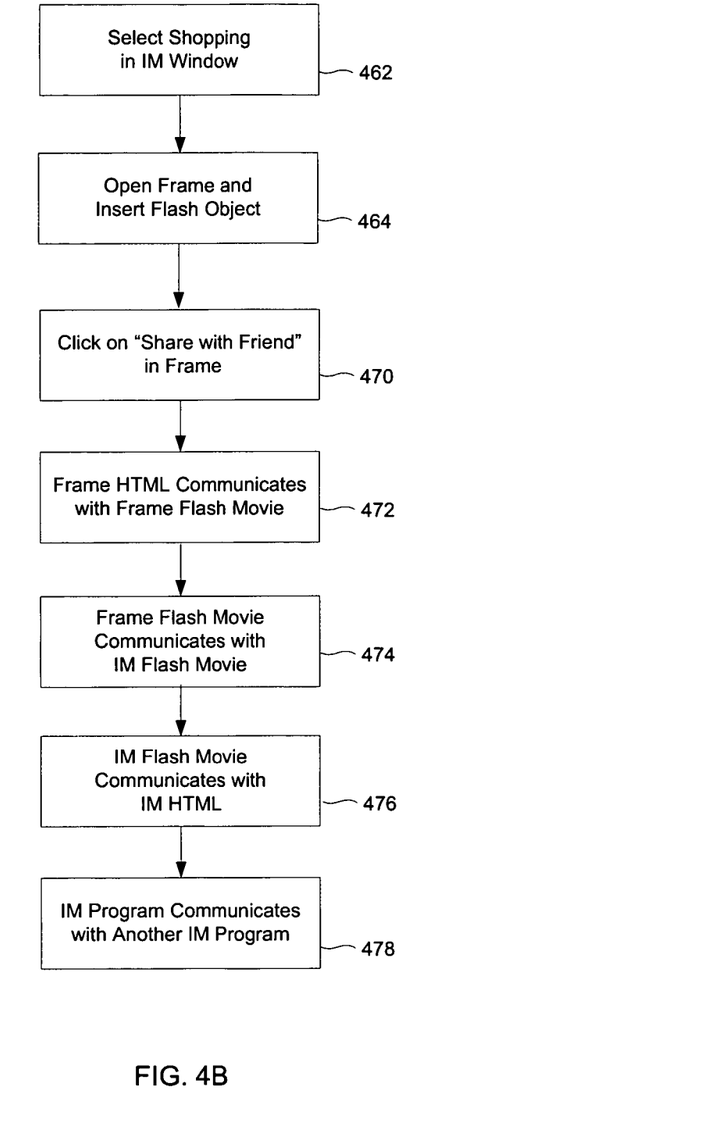
FIG. 4B is a flowchart of a technique used in one embodiment for communicating between an IM frame and a web browser frame.

In some embodiments, communicating shopping item information from web browser frame 404 to IM frame 416 can be performed using the technique described in conjunction with FIG. 4B. FIG. 4B is a flowchart of a technique used in one embodiment for communicating between an IM frame and a web browser frame. This technique can be used in conjunction with the embodiment shown in FIG. 4A, assuming plugin file 408 and plugin file 412 are Flash movies. In this example, a Flash plugin is used, but a Flash plugin is just one example of many plugin programs that can be used. In this example, shopping is selected in an IM window (462). For example, shopping can be selected by clicking on a shopping button in an IM window. Alternatively, shopping can be selected by clicking on a shopping item, such as one of shopping items 432 as shown in FIG. 4A. Once shopping is selected, a shopping webpage is opened and a Flash object is inserted (464). The shopping webpage is opened in web browser frame 404. The shopping webpage can be the home page of a shopping website, or a page that includes information about a shopping item that was selected. The Flash object should be transparent to a user viewing the webpage unless the Flash movie serves a purpose other than for communication with another Flash movie. For example, the object can be an invisible pixel or pixels inserted in the corner or edge of the webpage. The Flash object can be a logo that would otherwise be in the webpage even if the webpage did not include a Flash movie. The Flash object could also be a button, such as "share with friend" button 428. Other Flash objects could potentially be inserted in the webpage to communicate with Flash movie 408, such as links 424.

Assuming that a shopping item has been selected, the "share with friend" button in the webpage can be clicked (470), causing HTML in the webpage to communicate with the webpage Flash movie (472). For example, in FIG. 4A, JavaScript in webpage 406 can send a call to Flash movie 408. The call can include information that indicates that the "share with friend button" has been clicked. The webpage Flash movie communicates with the IM Flash movie (474). For example, in FIG. 4A, Flash movie 408 can communicate with Flash movie 412. The IM Flash movie then communicates with HTML in the IM frame (476). For example, IM Flash movie 412 can send information to the IM program using fscommand. Once received, the IM program performs appropriate processing. The IM program then communicates with another IM program on another user's machine (478). This can include sending information associated with the shopping items to be shared. Computer 400 then displays the shared shopping items as shopping items 446 another shopping display in IM frame 442. Information can similarly be communicated to web browser frame 456 and the shopping items can be displayed in web browser frame 456.

As with the example shown in FIG. 2A, the second user does not necessarily need to have a web browser frame open. However, the second user may also wish to share shopping items with the first user, in which case, the technique can be symmetrically applied in the reverse direction. Also, more than two browser frames can be used. Accordingly, communication can occur between any number of plugin files and thus between any number of browser frames. Likewise, communication can also be performed between a browser frame and a browser window.

Figure 5:
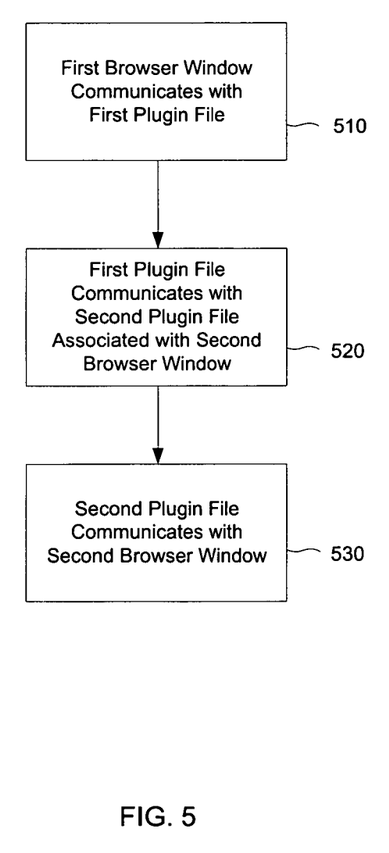
FIG. 5 is a flowchart of a technique used in one embodiment for communicating among browser windows.

FIG. 5 is a flowchart of a technique used in one embodiment for communicating among browser windows. A first browser window communicates with a first plugin file (510). For example, a webpage running in the first browser window can include JavaScript that calls a function in a first Flash movie. The first plugin file communicates with a second plugin file associated with a second browser window (520). For example, the first Flash movie can call a function in a second Flash movie. The second plugin file communicates with a second browser window (530). For example, the second Flash movie can call a function which runs in the second browser window.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of communicating among webpages running in different browser windows, comprising:

on a first computing device, a first webpage running in a first browser window that runs in conjunction with a first browser program calling a function in a first plugin file running on a first plugin that runs in conjunction with the first browser program;

on the first computing device, in response to the first webpage calling the function, the first plugin file sending a first communication to a second plugin file running on a second plugin that runs in conjunction with a second browser program that is different from the first browser program, wherein the second plugin file is associated with a second browser window;

on the first computing device, in response to the second plugin file receiving the first communication from the first plugin file, the second plugin file sending a second communication to a second webpage running in the second browser window that runs in conjunction with the second browser program;

wherein the first and second plugin files function as a communication medium between the first and second webpages;

in response to the second webpage receiving a communication from the first webpage, communicating between the second webpage running in the second browser window on the first computing device and a third webpage running in a third browser window on a second computing device via an instant messenger service.

2. The method of claim 1, further comprising:

on the second computing device, the third webpage running in the third browser window that runs in conjunction with a third browser program calling a function in a third plugin file running on a third plugin that runs in conjunction with the third browser program;

on the second computing device, in response to the third webpage calling the function in the third plugin file, the third plugin file sending a third communication to a fourth plugin file running on a fourth plugin that runs in conjunction with a fourth browser program that is different from the third browser program, wherein the fourth plugin file is associated with a fourth browser window;

on the second computing device, in response to the fourth plugin file receiving the third communication from the third plugin file, the fourth plugin file sending a fourth communication to a fourth webpage running in the fourth browser window that runs in conjunction with the fourth browser program;

wherein the third plugin and fourth plugin files function as a communication medium between the third and fourth webpages.

3. A non-transitory computer-readable storage medium storing one or more sequences of instructions which, when executed by one or more processors, causes the one or more processors to perform the steps of:

on a first computing device, a first webpage running in a first browser window that runs in conjunction with a first browser program calling a function in a first plugin file running on a first plugin that runs in conjunction with the first browser program;

on the first computing device, in response to the first webpage calling the function, the first plugin file sending a first communication to a second plugin file running on a second plugin that runs in conjunction with a second browser program that is different from the first browser program, wherein the second plugin file is associated with a second browser window;

on the first computing device, in response to the second plugin file receiving the first communication from the first plugin file, the second plugin file sending a second communication to a second webpage running in the second browser window that runs in conjunction with the second browser program;

wherein the first and second plugin files function as a communication medium between the first and second webpages;

in response to the second webpage receiving a communication from the first webpage, communicating between the second webpage running in the second browser window on the first computing device and a third webpage running in a third browser window on a second computing device via an instant messenger service.

4. The computer-readable storage medium of claim 3, further comprising instructions for:

on the second computing device, the third webpage running in the third browser window that runs in conjunction with a third browser program calling a function in a third plugin file running on a third plugin that runs in conjunction with the third browser program;

on the second computing device, in response to the third webpage calling the function in the third plugin file, the third plugin file sending a third communication to a fourth plugin file running on a fourth plugin that runs in conjunction with a fourth browser program that is different from the third browser program, wherein the fourth plugin file is associated with a fourth browser window;

on the second computing device, in response to the fourth plugin file receiving the third communication from the third plugin file, the fourth plugin file sending a fourth communication to a fourth webpage running in the fourth browser window that runs in conjunction with the fourth browser program;

wherein the third and fourth plugin files function as a communication medium between the third and fourth webpages.

* * * * *